(12) United States Patent
Valin et al.

(10) Patent No.: US 11,521,637 B1
(45) Date of Patent: Dec. 6, 2022

(54) RATIO MASK POST-FILTERING FOR AUDIO ENHANCEMENT

(71) Applicant: Amazon Technologies, Inc., Seattle, WA (US)

(72) Inventors: Jean-Marc Valin, Montreal (CA); Mehmet Umut Isik, Menlo Park, CA (US); Neerad Dilip Phansalkar, Half Moon Bay, CA (US); Ritwik Giri, Sunnyvale, CA (US); Karim Helwani, Mountain View, CA (US); Arvindh Krishnaswamy, Palo Alo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 17/037,498

(22) Filed: Sep. 29, 2020

Related U.S. Application Data

(60) Provisional application No. 63/067,816, filed on Aug. 19, 2020.

(51) Int. Cl.
*G10L 21/034* (2013.01)
*G06F 3/16* (2006.01)
*G10L 25/30* (2013.01)

(52) U.S. Cl.
CPC ............ *G10L 21/034* (2013.01); *G06F 3/165* (2013.01); *G10L 25/30* (2013.01)

(58) Field of Classification Search
CPC ....... G10L 21/034; G10L 25/30; G10L 15/16; G10L 21/0208; G10L 25/18; G10L 21/0232; G10L 15/20; G10L 21/0216; G10L 15/063; G10L 2021/02166; G10L 15/26; G10L 25/24; G10L 21/02; G10L 25/78; G10L 15/22; G10L 25/84; G10L 17/18; G10L 21/0272; G10L 21/0224; G10L 21/0364; G10L 25/51; G10L 17/00; G10L 25/21; G10L 21/0264; G10L 25/03; G10L 2015/223; G10L 25/63; G10L 15/08; G10L 17/02; G10L 2021/0282;
(Continued)

(56) References Cited

U.S. PATENT DOCUMENTS

2018/0115824 A1* 4/2018 Cassidy ............... H03G 3/3005
2019/0318755 A1* 10/2019 Tash .................... G10L 21/0232
(Continued)

FOREIGN PATENT DOCUMENTS

WO     WO-2010015371 A1 *  2/2010  ......... G10L 21/0208

OTHER PUBLICATIONS

Ding Liu, et al., "Experiments on Deep Learning for Speech Denoising", In Proceedings of Fifteenth Annual Conference of the International Speech Communication Association, 2014, pp. 1-5.
(Continued)

*Primary Examiner* — Akelaw Teshale
(74) *Attorney, Agent, or Firm* — S. Scott Foster; Kowert, Hood, Munyon, Rankin & Goetzel, P.C.

(57) ABSTRACT

Post-filtering may be performed for ratio masks as part of audio enhancement. Audio data may be received. A machine learning model may be applied to generate gain values for different spectrum bands of the audio data. The gain values may then be modified using an envelope post-filter according to a monotonically increasing function applied to the gain values to produce modified gain values used to generate an enhanced version of the audio data.

20 Claims, 7 Drawing Sheets

(58) Field of Classification Search
CPC ....... G10L 21/038; G10L 17/04; G10L 25/69; G10L 15/25; G10L 17/22; G10L 17/26; G10L 2015/088; G10L 2021/065; G10L 13/047; G10L 15/30; G10L 25/00; G10L 13/08; G10L 15/142; G10L 19/02; G10L 25/15; G10L 25/60; G10L 25/81; G10L 15/065; G10L 19/0212; G10L 2021/02168; G10L 25/45; G10L 25/48; G10L 25/90; G10L 17/10; G10L 19/018; G10L 2021/02087; G10L 13/02; G10L 15/06; G10L 15/1815; G10L 15/183; G10L 15/24; G10L 17/20; G10L 19/00; G10L 19/26; G10L 2015/025; G10L 21/003; G10L 21/0308; G10L 21/0388; G10L 21/055; G10L 25/12; G10L 25/27; G10L 25/66; G10L 13/033; G10L 15/04; G10L 15/10; G10L 15/12; G10L 15/187; G10L 17/06; G10L 19/005; G10L 19/008; G10L 19/0204; G10L 19/0208; G10L 19/0216; G10L 19/032; G10L 2021/0135; G10L 2021/02163; G10L 2021/02165; G10L 21/06; G10L 25/87; G10L 13/06; G10L 13/07; G10L 13/10; G10L 2015/0631; G10L 2015/0635; G10L 2021/0575; G10L 21/04; G10L 25/93; G10L 13/00; G10L 13/04; G10L 15/07; G10L 15/14; G10L 15/19; G10L 15/285; G10L 17/14; G10L 19/012; G10L 19/04; G10L 19/083; G10L 19/10; G10L 19/16; G10L 19/173; G10L 2021/02161; G10L 2021/105; G10L 21/00; G10L 21/028; G10L 21/10; G10L 13/027; G10L 13/0335; G10L 15/00; G10L 15/005; G10L 15/01; G10L 15/083; G10L 15/18; G10L 15/197; G10L 15/34; G10L 17/08; G10L 17/12; G10L 17/16; G10L 17/24; G10L 19/035; G10L 19/09; G10L 19/20; G10L 19/22; G10L 19/265; G10L 2013/105; G10L 2015/0638; G10L 2015/225; G10L 2015/227; G10L 2021/03646; G10L 2025/906; G10L 21/013; G10L 21/0316; G10L 21/057; G10L 25/06; G06F 3/165

See application file for complete search history.

(56) References Cited

U.S. PATENT DOCUMENTS

2020/0066296 A1\* 2/2020 Sargsyan ............ G10L 21/0232
2021/0125625 A1\* 4/2021 Huang .................... G10L 25/21

OTHER PUBLICATIONS

Yong Xu, et al., "A Regression Approach to Speech Enhancement Based on Deep Neural Networks", IEEE/ACM Transactions on Audio, Speech, and Language Processing, vol. 23, No. 1, Jan. 2015, pp. 7-19.
Ke Tan, et al., "A Convolutional Recurrent Neural Network for Real-Time Speech Enchancement", Interspeech 2018, Sep. 2-6, 2018, pp. 1-5.
Arun Narayanan, et al., "Ideal Ratio Mask Estimation Using Deep Neural Networks for Robust Speech Recognition", IEEE, In Proceedings of International Conference on Acoustics, Speech and Signal Processing (ICASSP), 2013, pp. 7092-7096.
Yan Zhao, et al., "DNN-Based Enhancement of Noisy and Reverberant Speech", IEEE, In Proceedings of International Conference on Acoustics, Speech and Signal Processing (ICASSP), 2016, pp. 6525-6529.
Donald S. Williamson, et al., "Complex Ratio Masking for Monaural Speech Separation", IEEE/ACM Transactions on Audio Speech Language Processing, 24(3), Mar. 2016, pp. 483-492.
Santiago Pascual, et al., "SEGAN: Speech Enhancement Generative Adversarial Network", arXiv: 1703.09452v3, Jun. 9, 2017, pp. 1-5.
Dario Rethage, et al., "A Wavenetfor Speech Denoising", arXiv:1706.07162v3, Jan. 31, 2018, pp. 1-11.
Craig Macartney, et al., "Improved Speech Enhancement with the Wave-U-Net", arXiv:1811.11307v1, Nov. 27, 2018, pp. 1-5.
Jean-Marc Valin, "A Hybrid DSP/Deep Learning Approach to Real-Time Full-Band Speech Enhancement", arXiv:1709.082433, May 31, 2018, pp. 1-5.
John P. Princen, et al., "Analysis/Synthesis Filter Bank Design Based on Time Domain Aliasing Cancellation", IEEE Transactions on Acoustics, Speech, and Signal Processing, vol. ASSP-34, No. 5, Oct. 1986, pp. 1153-1161.
Hedwig Gockel, et al., "Asymmetry of masking between complex tones and noise: Partial loudness", The Journal of the Acoustical Society of America, 114(1), Jul. 2003, pp. 349-360.
D. Talkin. A robust algorithm for pitch tracking (RAPT). In Speech Coding and Synthesis, chapter 14, Elsevier Science, 1995, pp. 495; 497-518.
Ted Painter, et al., "Perceptual Coding of Digital Audio", in Proceedings of the IEEE, vol. 88, No. 4, Apr. 2000, pp. 451-513.
Kyunghyun Cho, et al., "On the Properties of Neural Machine Translation: Encoder-Decorder Approaches", arXiv:1409 1259v2, Oct. 7, 2014, pp. 1-9.
Yan Zhao, et al., "Late Reverberation Suppression Using Recurrent Neural Networks With Long Short-Term Memory", In Proceedings of International Conference on Acoustics, Speech and Signal Processing (ICASSP), IEEE, 2018, pp. 5434 5438.
Hakan Erdogan, et al., "Investiagtions on Data Augmentation and Loss Functions for Deep Learning Based Speech-Background Separation", Interspeech 2018, Sep. 2-6, 2018, pp. 1-5.
Juin-Hwey Chen, et al., "Adaptive Postfiltering for Quality Enhancement of Coded Speech", in IEEE Transactions on Speech and Audio Processing, vol. 3, No. 1, Jan. 1995, pp. 59-71.
Valentini Botinhao, et al., "Investigating RNN-based speech enhancement methods for noise-robust Text-to-Speech", In Proceedings of ISCA Speech Synthesis Workshop (SSW), 2016, pp. 146-152.
Chandan K. A. Reddy, et al., "The INTERSPEECH 2020 Deep Noise Suppression Challenge: Datasets, Subjective Speech Quality and Testing Framework", arXiv preprint arXiv:2001.08662, 2020, pp. 1-5.
Yangyang Xia, et al., Weighted Speech Distortion Losses for Neural-Network-Based Real-Time Speech Enhancement, arXiv:2001.10601v2. Feb. 12, 2020, pp. 1-5.

\* cited by examiner

RATIO MASK POST-FILTERING FOR AUDIO ENHANCEMENT

RELATED APPLICATIONS

This application claims benefit of priority to U.S. Provisional Application Ser. No. 63/067,816, entitled "RATIO MASK POST-FILTERING FOR AUDIO ENHANCEMENT," filed Aug. 19, 2020, and which is incorporated herein by reference in its entirety.

BACKGROUND

Over the past few years, audio enhancement methods (e.g., for recorded human speech) based on deep learning have greatly surpassed traditional methods based on spectral subtraction and spectral estimation. Many of these new techniques operate directly in the short-time Fourier transform (STFT) domain, resulting in a high computational complexity.

Figure 1:
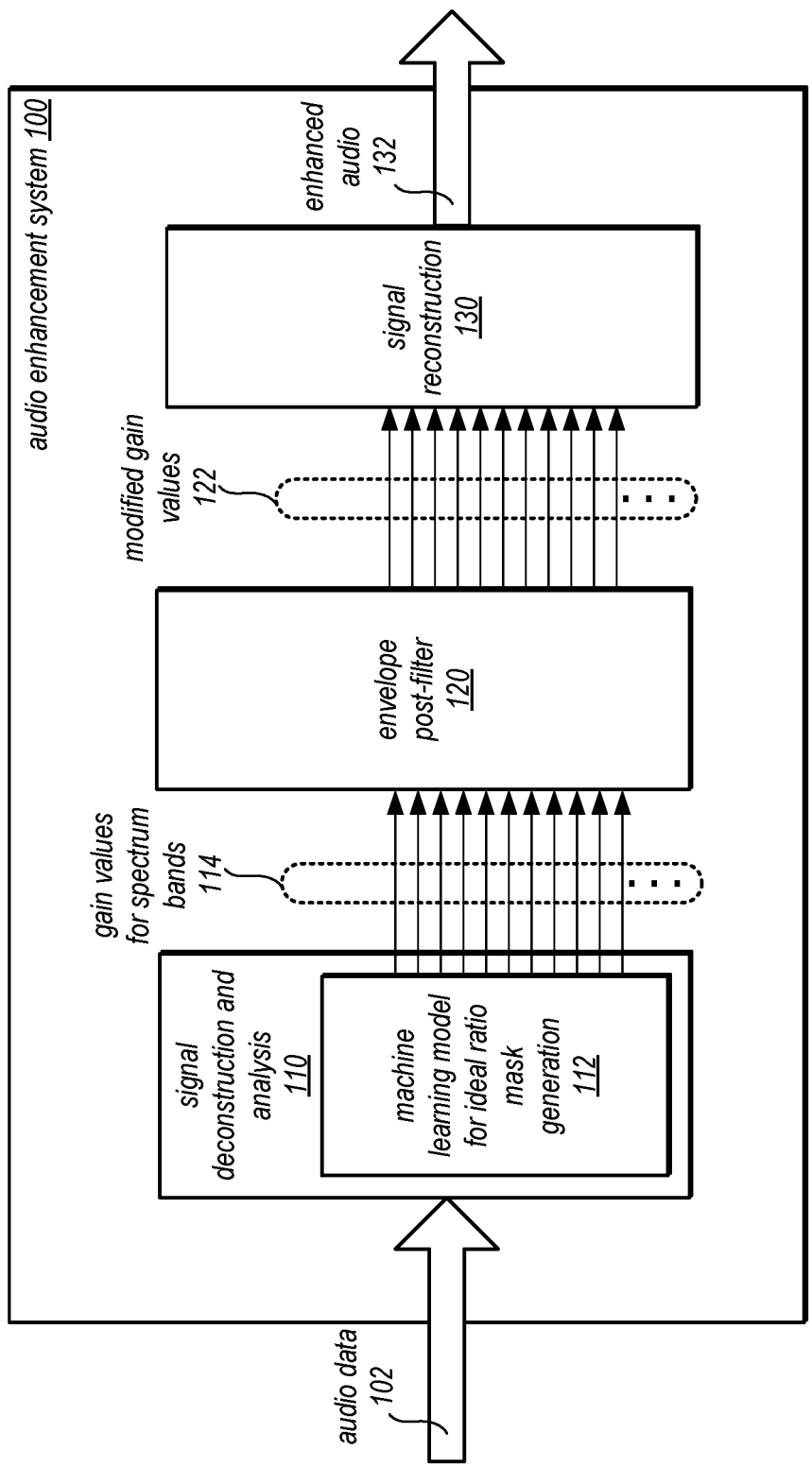
FIG. 1 illustrates a logical block diagram of ratio mask post-filtering for audio enhancement, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for ratio mask post-filtering for audio enhancement are described herein. STFT-based audio enhancement techniques may enhance audio, in various embodiments, by determining ideal ratio masks. An ideal ratio mask may, for instance, be determined in order to identify portions of audio data as noise or not-noise (e.g., speech). In this way, noisy portions of audio data can be reduced, enhancing the not-noise portions for better playback. In various embodiments, machine learning models may be implemented to determine ideal ratio masks, such as a deep neural network (DNN). Introducing ideal ratio masks can, however, increase audio enhancement system complexity (e.g., as a result of a large number of neurons and weights to determine ideal ratio masks). Ratio mask post-filtering for audio enhancement, however, can be implemented in various embodiments to further enhance the audio data with ideal ratio masks without introducing further computational complexity, increasing the quality of enhanced audio data without greatly increasing computational costs. Moreover, using a ratio mask to enhance audio signal may still leave perceptible noise in the audio signal. Ratio mask post-filtering may, in various embodiments, make the noise less audible without significantly distorting the audio signal.

In various embodiments, audio data may be modeled or represented as an audio signal. For example, in some embodiments, $x(n)$ may represent a clean audio (e.g., speech signal). In various embodiments, audio signals may be captured by audio sensors, such as a hands-free microphone in a noisy room. The audio signal captured by an audio signal may be captured in a noisy environment, and the audio signal model may account for the noisy environment, such as in the scenario of the hands-free microphone given above, by representing the audio signal as $y(n)=x(n)*h(n)+\eta(n)$, where $\eta(n)$ is the additive noise from the room, $h(n)$ is the impulse response from a talker to the microphone, and * denotes the convolution. Furthermore, the clean audio can be represented as $x(n)=p(n)+u(n)$, where $p(n)$ is a locally periodic component and $u(n)$ is a stochastic component. In some embodiments, transients such as stops may be considered as part of the stochastic component.

In various embodiments, enhanced audio data may be represented as $\hat{x}(n)=\hat{p}(n)+\hat{u}(n)$ which may be as perceptually close to the clean speech $x(n)$ as possible. Separating the stochastic component $u(n)$ from the environmental noise $n(n)$ may be performed as $\hat{u}(n)$ can be made to sound like $u(n)$, in various embodiments, by filtering the mixture $u(n)*h(n)+\eta(n)$ to have the same spectral envelope as $u(n)$. Since $p(n)$ is periodic and the noise may be assumed not to have strong periodicity, $\hat{p}(n)$ can be estimated. In various embodiments, $\hat{p}(n)$ may have the same spectral envelope and the same period as $p(n)$. In various embodiments, an enhanced audio signal can be constructed using the same spectral envelope, and frequency-dependent periodic-to-stochastic ratio, as the clean signal. For both these properties, a resolution may be used that matches human perception. In various embodiments, an STFT may be used to provide this resolution (e.g., with 20-ms windows and 50% overlap), such as the STFT illustrated in FIG. 3.

Figure 3A:
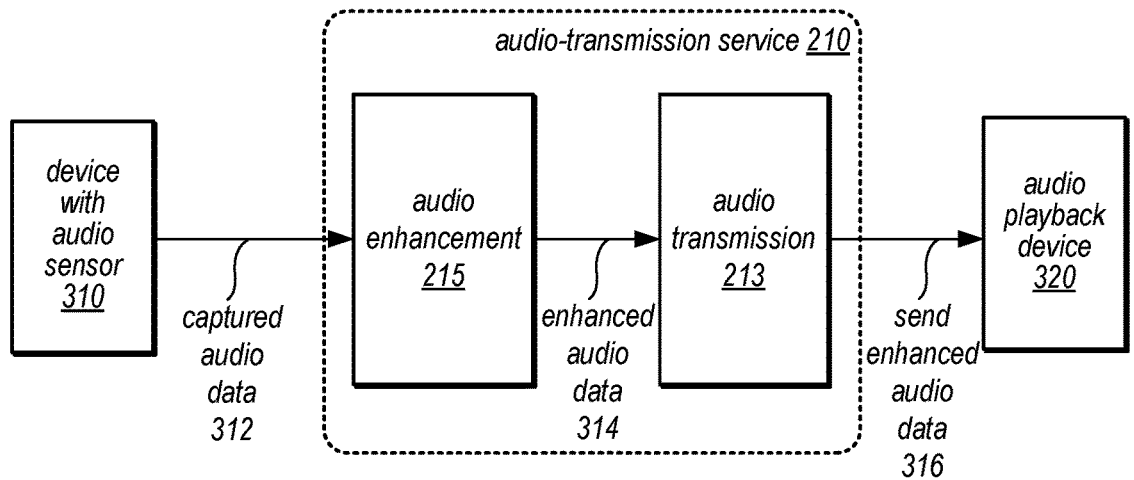
FIGS. 3A-3C illustrate logical block diagrams of different interactions of an audio sensor with provider network services, according to some embodiments.

FIG. 1 illustrates a logical block diagram of ratio mask post-filtering for audio enhancement, according to some embodiments. Audio enhancement system 100 may be implemented as part of various network-based systems or services or stand-alone systems, that receive audio data 102 (e.g., speech audio) and provide as output enhanced audio 132 (e.g., removing noise). For example, an audio enhancement system 100 may be implemented "service-side," as illustrated in FIG. 3A, where the audio sensor that captures the audio data may be separate from a service or system that implements audio enhancement system 100. In such embodiments, the audio data may be sent from the audio sensor (e.g., over a network connection) to the system or service for audio enhancement. In other embodiments, audio enhancement system 100 may be implemented as part of a same device as the audio sensor (e.g., as part of an audio processing component or system implemented within a device that includes an audio sensor, such as a mobile phone or device, including various types of "smart" phones, "smart" speakers, "smart" televisions, content delivery or audio/video streaming devices that capture audio data, and so on).

Audio enhancement system 100 may implement various types of audio enhancement pipelines, such as the example of an audio enhancement pipeline discussed below with regard to FIG. 4. For example, audio enhancement system may implement various signal deconstruction techniques and analysis may be implemented, as indicated at 110. Signal deconstruction and analysis 110 may include, for instance, various stages or operations for determining or extracting different spectrum bands using techniques such as STFT. Signal deconstruction and analysis 110 may include operations or stages for various other types of audio enhancement operations, such as pitch analysis and pitch filtering, in some embodiments. In various embodiments, signal deconstruction and analysis 110 may implement techniques to determine an ideal ratio mask, as discussed above. For example, a machine learning model 112 that determines ideal ratio masks (e.g., a DNN such as recurrent neural network (RNN), may be implemented to determine the ideal ratio mask.

In at least some embodiments, the ideal ratio mask may be determined for individual bands of the spectrum of audio data 102 (e.g., different frequency bands). Gain values 114 may be used to represent the ideal ratio mask values determined for the different bands of the spectrum of the audio data. In various embodiments, an envelope post-filter, such as envelope post-filter 120, may be implemented to perform ratio mask post filtering. As discussed below, envelope post-filter 120 may determine and provide modified gain values 122 to signal reconstruction 130 to generate the enhanced audio signal. Although not illustrated, various other features of audio data 102 determined from signal deconstruction and analysis 110 may also be provided for signal reconstruction 130 (e.g., as illustrated in FIG. 4 below). Signal reconstruction 130 may be implemented as part of audio enhancement system to reconstruct the audio data 102 into enhanced audio 132 based on the analysis and other filtering of the audio data. For example, inverse STFT may be performed to reconstruct the enhanced audio 132 based on the filtering and analyses of the individual spectrum bands.

Please note that the previous description of ratio mask post-filtering for audio enhancement for transmitted audio is a logical illustration and thus is not to be construed as limiting as to the implementation of an audio enhancement system.

This specification begins with a general description of a provider network that implements multiple different services, including an audio-transmission service, which may implement ratio mask post-filtering for audio enhancement for transmitted audio. Then various examples of, including different components/modules, or arrangements of components/module that may be employed as part of implementing the services are discussed. A number of different methods and techniques to implement ratio mask post-filtering for audio enhancement for transmitted audio are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
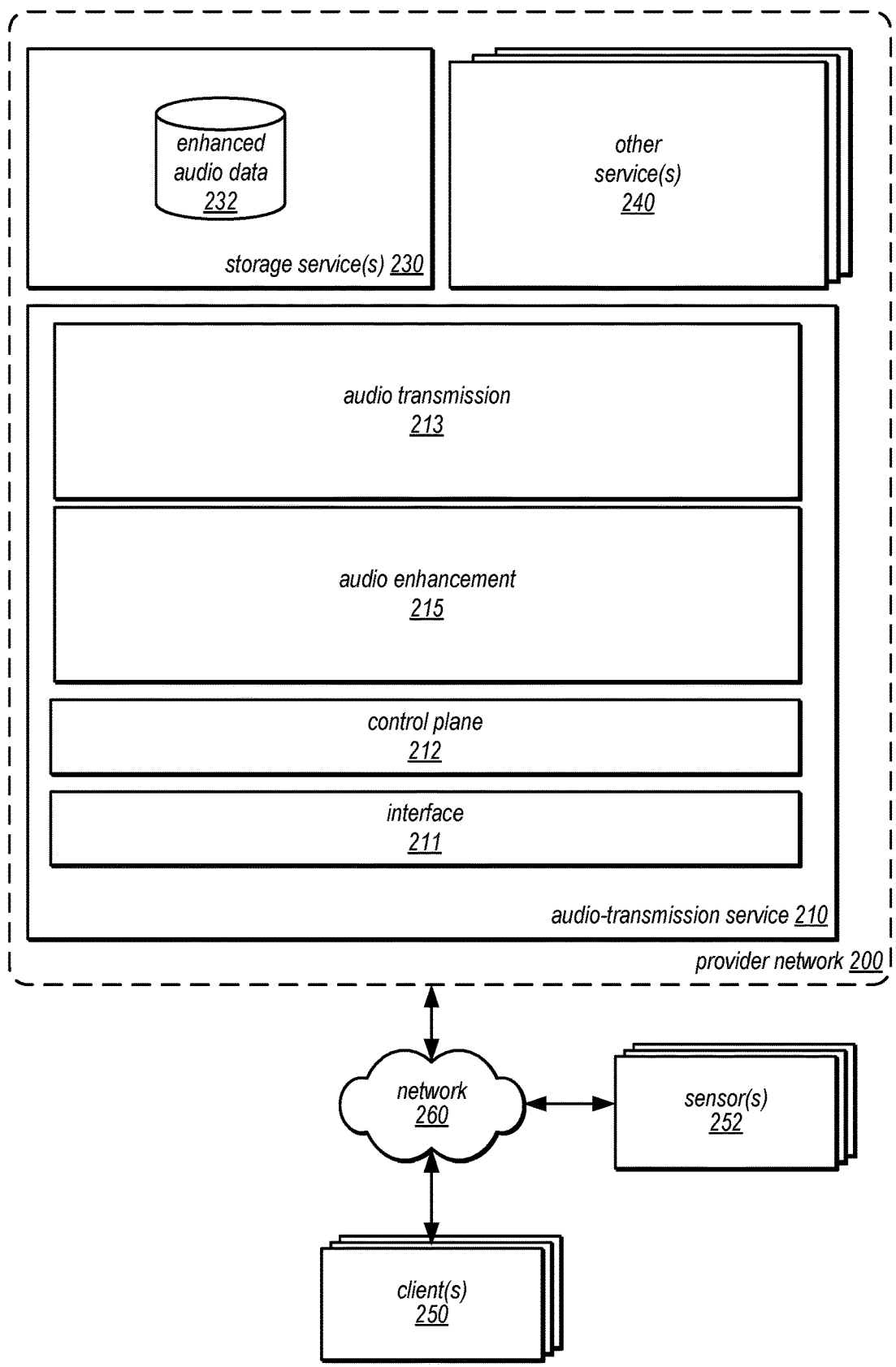
FIG. 2 illustrates an example provider network that may implement an audio-transmission service that implements ratio mask post-filtering for audio enhancement for transmitted audio, according to some embodiments.

FIG. 2 illustrates an example provider network that may implement an audio-transmission service that implements ratio mask post-filtering for audio enhancement for transmitted audio, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and services offered by the provider network 200, in one embodiment. In some embodiments, provider network 200 may implement various computing resources or services, such as audio-transmission service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of audio-transmission service 210 may be implemented by a particular node or may be distributed across several nodes. In some embodiments, a given node may implement the functionality of more than one service system component (e.g., more than one data store component).

Audio-transmission service 210 may implement interface 211 to allow clients (e.g., client(s) 250 or clients implemented internally within provider network 200, such as a client application hosted on another provider network service like an event driven code execution service or virtual compute service) to send audio data for enhancement, storage, and/or transmission. In at least some embodiments, audio-transmission service 210 may also support the transmission of video data along with the corresponding audio data and thus may be an audio/video transmission service, which may perform the various techniques discussed above with regard to FIG. 1 and below with regard to FIGS. 3A-6 for audio data captured along with video data, in some embodiments. For example, audio-transmission service 210 may implement interface 211 (e.g., a graphical user interface, programmatic interface that implements Application Program Interfaces (APIs) and/or a command line interface) may be implemented so that a client application can submit an audio stream captured by sensor(s) 252 to be stored as enhanced audio data 232 stored in storage service(s) 230, or other storage locations or sources within provider network 200 or external to provider network 200 (e.g., on premise data storage in private networks). Interface 211 may allow a client to cause audio enhancement using the techniques discussed above with regard to FIG. 1 and below with regard to FIGS. 3A-6, (e.g., as part of audio transmission, such as voice transmission like Voice over IP (VoIP).

Audio-transmission service 210 may implement a control plane 212 to perform various control operations to implement the features of audio-transmission service 210. For example, control plane 212 may monitor the health and performance of requests at different components audio-transmission 213 and audio enhancement 215 (e.g., the health or performance of various nodes implementing these features of audio-transmission service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available node to begin work on the request.

Figure 3B:
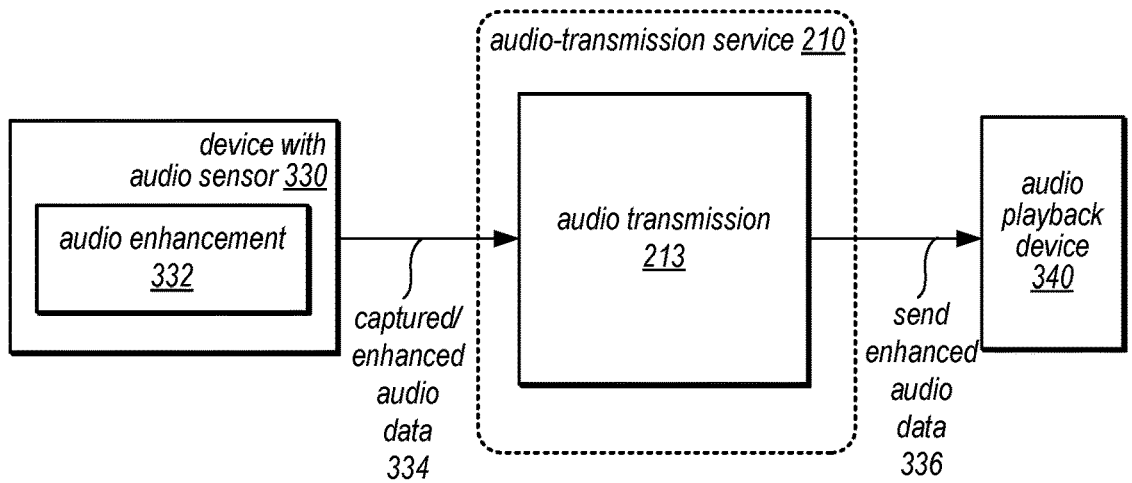

Audio-transmission service 210 may implement audio-transmission 213, which may facilitate audio communications (e.g., for audio-only, video, or other speech communications), speech commands or speech recordings, or various other audio transmissions, as discussed in the examples below with regard to FIGS. 3A and 3B. Audio-transmission service 210 may implement audio enhancement 215 to provide an audio enhancement system (e.g., like audio enhancement system 100 in FIG. 1), which may implement audio enhancement pipelines, like those discussed below with regard to FIGS. 4-5 and techniques like those discussed below with regard to FIG. 6.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. Data storage service(s) 230 may be accessed via programmatic interfaces (e.g., APIs) or graphical user interfaces. Enhanced audio 232 may be put and/or retrieved from data storage service(s) 230 via an interface for data storage services 230, in some embodiments, as discussed below with regard to FIG. 3C.

Generally speaking, clients 250 may encompass any type of client that can submit network-based requests to provider network 200 via network 260, including requests for audio-transmission service 210 (e.g., a request to enhance, transmit, and/or store audio data). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other application that may make use of audio-transmission service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like audio-transmission service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Sensor(s) 252, such as microphones, may, in various embodiments, collect, capture, and/or report various kinds of audio data, (or audio data as part of other captured data like video data). Sensor(s) 252 may be implemented as part of devices, such as various mobile or other communication and/or playback devices, such as microphones embedded in speaker or other voice command-enabled devices. In some embodiments, some or all of audio enhancement techniques may be implemented as part of sensors 252 before transmission of enhanced audio to audio-transmission service 210, as discussed below with regard to FIGS. 3B and 3C.

Figure 3C:
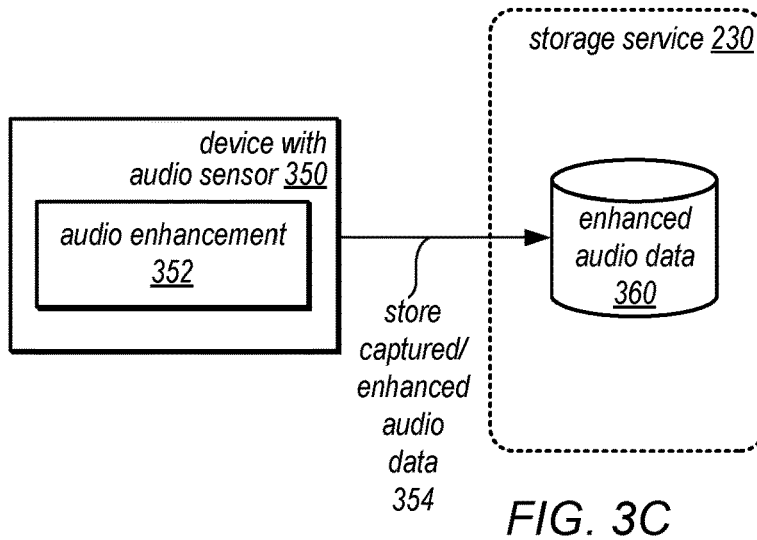

As discussed above, different interactions between sensors that capture audio data and services of a provider network 200 may invoke audio enhancement, in some embodiments. FIGS. 3A-3C illustrate logical block diagrams of different interactions of an audio sensor with provider network services, according to some embodiments. In FIG. 3A, audio sensor 310 may capture audio data from various environments, including speech audio from noisy environments as discussed above with regard to FIG. 1. Device with audio sensor 310 may send directly captured audio data 312 to audio-transmission service 210, in some embodiments, via an interface for audio-transmission service 210 (e.g., interface 211), such as by sending captured audio data 312 over wired or wireless network connection to audio-transmission service 210. In some embodiments, device with audio sensor 310 may provide the captured audio data to another device that sends the capture audio data 312 to audio-transmission service (not illustrated). Capture audio data may be transmitted as an audio file or object, or as a stream of audio, in some embodiments. For instance, for live communications, such as a VoIP call, captured audio data 312 may be a stream of audio data.

Audio-transmission service 210 may process captured audio data 312 through audio enhancement 215, in various embodiments. For example, an audio enhancement pipeline like those discussed below with regard to FIG. 4 may be implemented to provide enhanced audio data 314, including enhanced audio data with ratio mask post-filtering as discussed above with regard to FIG. 1 and below with regard to FIGS. 4 and 6. Audio transmission 213 may receive the enhanced audio data 314, identify a destination for the enhanced audio, such as audio playback device 320, and send the enhanced audio data 316 to audio playback device 320, in some embodiments. Given the improvements to audio quality provided by audio enhancement, including the reduction of noisy bands with ratio mask post-filtering, audio playback device 320 may play the enhanced audio data 316 to one or more listeners (e.g., which may benefit from the improvements to the captured audio data in the form of more clear and perceptible speech).

Audio enhancement systems may also be implemented separately from audio-transmission service 210, in some embodiments. For example, as illustrated in FIG. 3B, device with audio sensor 330 may also implement audio enhancement 332, which may be an audio enhancement pipeline like those discussed below with regard to FIG. 4 may be implemented to provide enhanced audio data 334, including enhanced audio data with ratio mask post-filtering as discussed above with regard to FIG. 1 and below with regard to FIGS. 4 and 6. Audio enhancement 332 may be implemented as part of other pre-transmission processing implemented by device with audio sensor 330, such as various encryption, compression, or other operations performed on capture audio data prior to transmission to audio-transmission service 210.

Device with audio sensor 330 may then send the capture/enhanced audio data 334 to audio-transmission service 210 for transmission (e.g., via interface 211), in some embodiments. Audio transmission 213 may receive the enhanced audio data 334, identify a destination for the enhanced audio, such as audio playback device 340, and send the enhanced audio data 336 to audio playback device 340, in some embodiments.

In some embodiments, audio may be stored for later retrieval and/or processing. As illustrated in FIG. 3C, device with audio sensor 350 may also implement audio enhancement 352, which may be an audio enhancement pipeline like those discussed below with regard to FIG. 4 may be implemented to provide enhanced audio data 354, including enhanced audio data with ratio mask post-filtering as discussed above with regard to FIG. 1 and below with regard to FIGS. 4 and 7. Audio enhancement 352 may be implemented as part of other pre-transmission processing implemented by device with audio sensor 350, such as various encryption, compression, or other operations performed on capture audio data prior to storage in storage service 230. Device with audio sensor 350 may then store the capture/enhanced audio data 354 to storage service 230, which may store enhanced audio data 360 until retrieved for future processing and/or playback, in some embodiments.

Figure 4:
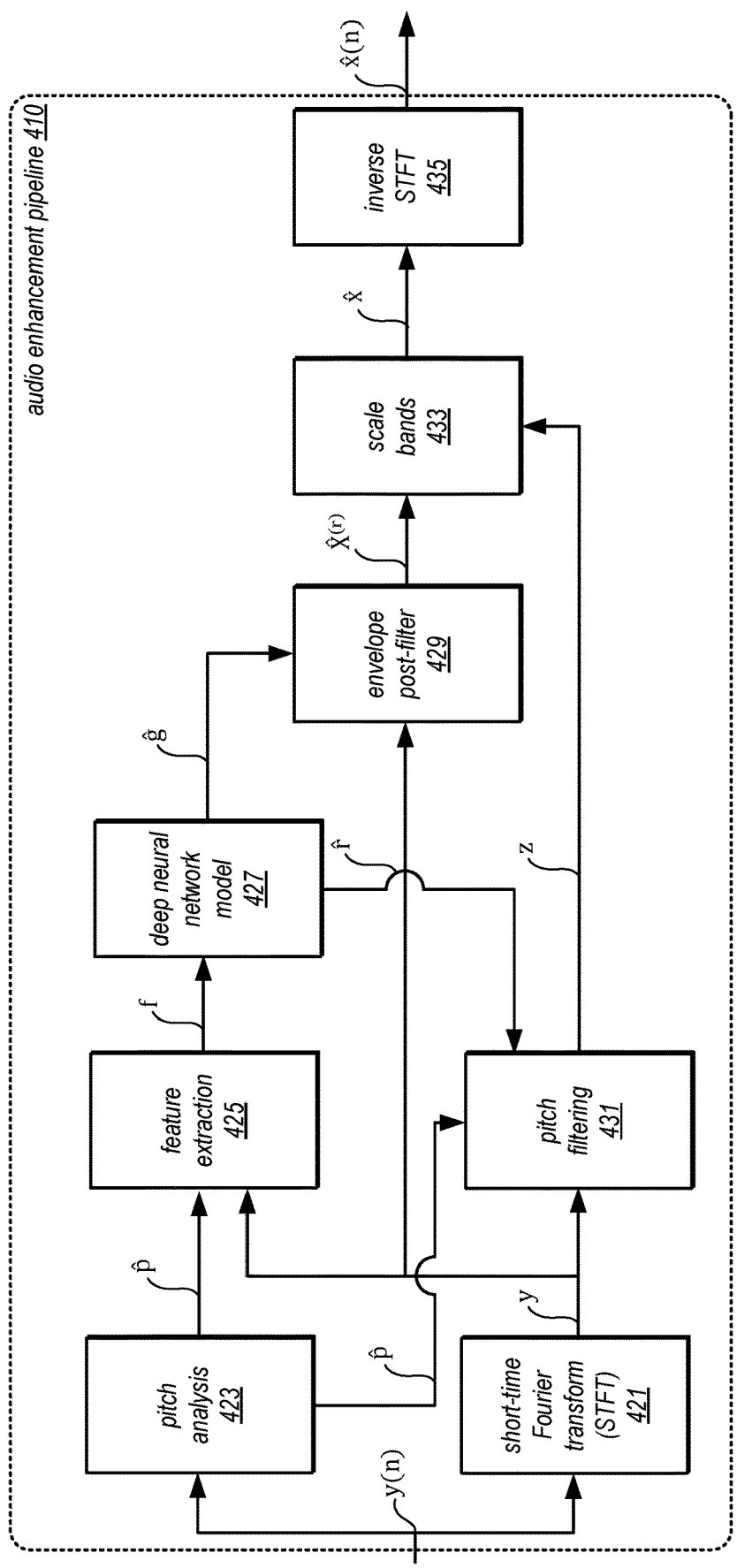
FIG. 4 illustrates a logical block diagram of an example audio enhancement pipeline that may implement ratio mask post-filtering for audio enhancement, according to some embodiments.

FIG. 4 illustrates a logical block diagram of an example audio enhancement pipeline that may implement ratio mask post-filtering for audio enhancement, according to some embodiments. As discussed above, received audio data may be represented as audio signal y(n). Audio enhancement pipeline 410 may implement STFT 421 to determine different spectrum bands. STFT 421 may provide these spectrum bands y to feature extraction stage 425, pitch filtering stage 431 and envelope post-filter 429, in some embodiments. Audio enhancement pipeline 410 may also implement pitch analysis stage 423, in some embodiments. Pitch analysis 423 may, in some embodiments, provide an approximation p̂(n) of a perfect periodic component p(n) from clean speech, in some embodiments, which may be provided to both feature extraction 425 and pitch filtering 425.

Feature extraction 425 may provide a feature set f for determining the ideal ratio mask of spectrum bands at deep neural network model 427. FIG. 4, discussed below, describes the generation of ideal ratio masks by deep neural network model 427 which are provided as $\hat{g}$ to envelope post-filter 429. As discussed in detail below with regard to FIG. 6, envelope post-filter 429 may modify the gain values of $\hat{g}$ for the different spectrum bands according to the gain values themselves (e.g., by multiplying the gain values according to a monotonically increasing function that takes, as input the respective gain value). A global gain value may also be applied, in some embodiments.

The filtered audio signal $\hat{X}^{(r)}$ may be provided to scale bands 433, in some embodiments. Scale bands 433 may also, in some embodiments, use the output z of pitch filtering 431. Pitch filtering 431 may, in some embodiments, reconstruct the harmonic properties of clean speech by applying comb filtering based on pitch frequency. Inverse STFT 435 may regenerate the audio signal $\hat{x}$ from scale bands 433 to generate $\hat{x}(n)$, in some embodiments.

Figure 5:
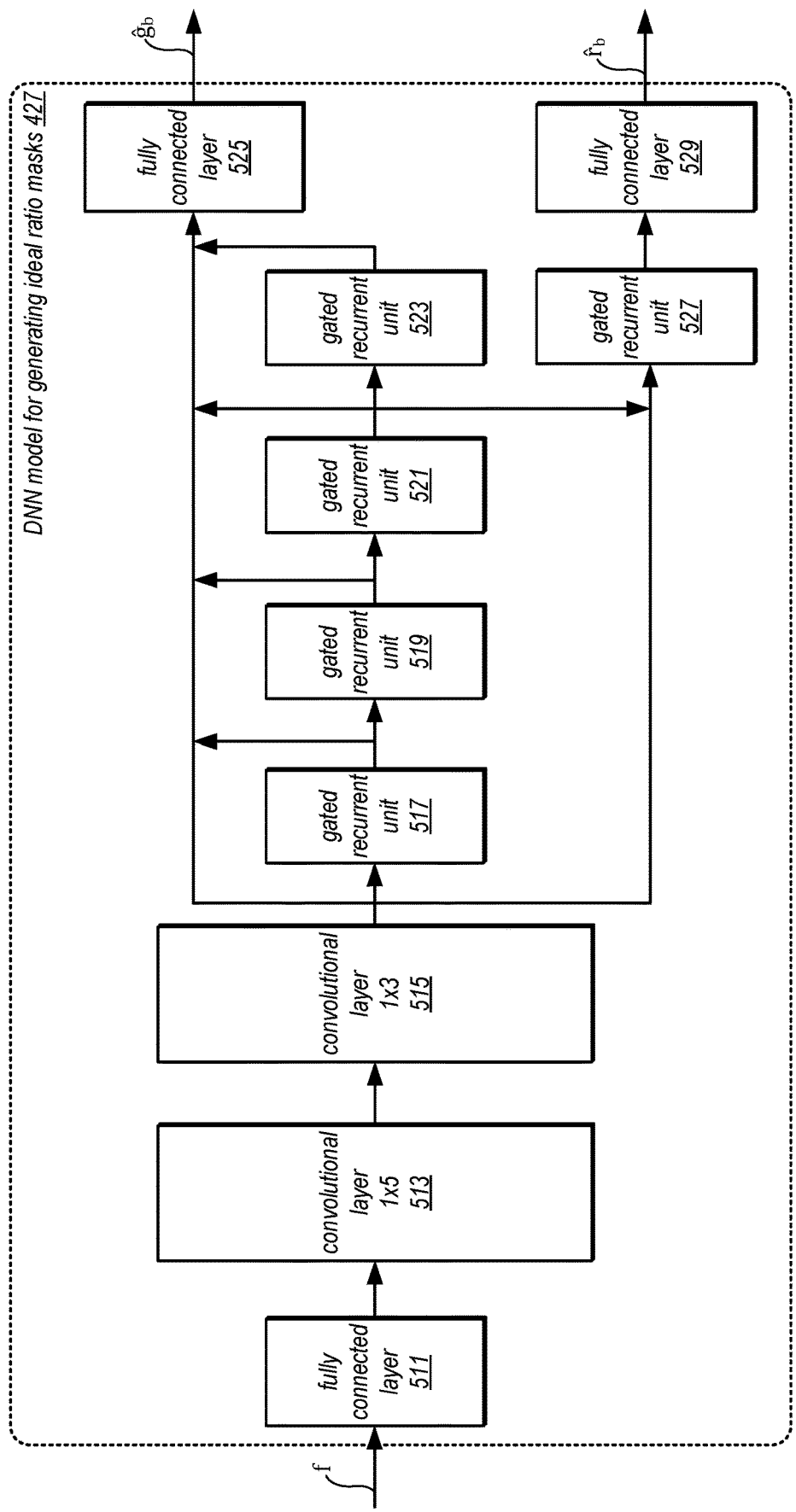
FIG. 5 illustrates a logical block diagram for a machine learning model that determines ratio masks, according to some embodiments.

Various types of machine learning models may be implemented to determine the gain values for the ratio mask, which may then be modified by an envelope post-filter. For example, deep neural networks, like a recurrent neural network, may be used to determine ideal ratio masks for audio enhancement. FIG. 5 illustrates a logical block diagram for a DNN model 427 generating ideal ratio masks, according to some embodiments.

The model 427 may receive features f as discussed above with regard to FIG. 4 at a 128 fully connected layer 511, which may then pass to two convolutional layers, a 512, 1×5 convolutional layer 513 followed by a 512, 1×3 convolutional layer 515, and 512 gated recurrent unit (GRU) layers 517, 519, 521, and 523 respectively along with a 34 fully connected layer 525 that outputs the gain values $\hat{g}_b$ and a 128 gated recurrent unit 527 and fully connected layer 529 that outputs $\hat{r}_b$, as shown in FIG. 5. In some embodiments, the convolutional layers may be aligned in time such as to use up to M frames into the future. To achieve 40 ms look-ahead including the 10-ms overlap, M=3 may be used in some embodiments.

In various embodiments, the input features used by the model may be tied to 34 equivalent rectangular bandwidth (ERB) bands. For each band two features may be used: the magnitude of the band with look-ahead $Y_b(\ell+M)$ and the pitch period without look-ahead $q_{y,b}(\ell)$ (the coherence estimate itself uses the full look-ahead). In addition to those 68 band-related features, the pitch period $T(\ell)$ may be used, as well as an estimate of the pitch correlation with look-ahead, for a total of 70 input features. For each band b, there may be 2 outputs: the gain $\hat{g}_b(\ell)$ approximates $g_b^{(att)}(\ell)g_b(\ell)$ and the strength $\hat{r}_b(\ell)$ approximates $r_b(\ell)$.

The weights of the model may be forced to a ±½ range and quantized to 8-bit integers, in some embodiments. This reduces the memory requirement (and bandwidth), while also reducing the computational complexity of the inference by taking advantage of vectorization.

In various embodiments, a loss function for the gain may consider that the perceptual loudness of a signal may be proportional to its energy raised to a power $\gamma/2$, (e.g., $\gamma=0.5$). The gains may be raised to the power $\gamma$ before computing the metrics, in some embodiments. In addition to the squared error, the fourth power may be used to overemphasize the cost of making large errors (e.g. completely attenuating speech):

$$\mathcal{L}_g \sum_b (g_b^\gamma - \hat{g}_b^\gamma)^2 + C_4 \sum_b (g_b^\gamma - \hat{g}_b^\gamma)^4$$

where $C_4=10$ may be used to balance between the $L_2$ and $L_4$ terms, in some embodiments.

Although FIGS. 2-5 have been described and illustrated in the context of a provider network implementing an audio-transmission service, the various components illustrated and described in FIGS. 2-5 may be easily applied to other systems that implement audio enhancement. As such, FIGS. 2-5 are not intended to be limiting as to other embodiments of ratio mask post-filtering for audio enhancement.

Figure 6:
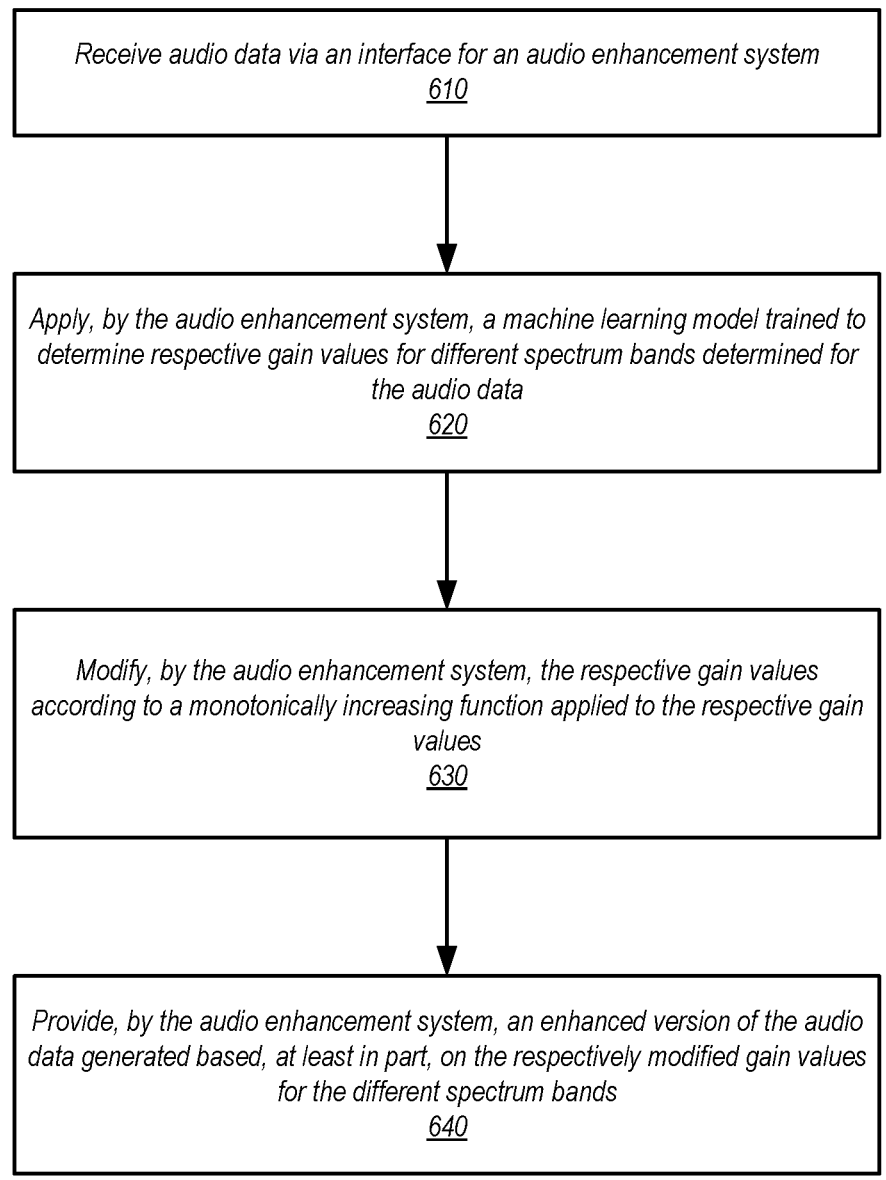
FIG. 6 illustrates a high-level flowchart of various methods and techniques to implement ratio mask post-filtering for audio enhancement, according to some embodiments.

FIG. 6 illustrates a high-level flowchart of various methods and techniques to implement ratio mask post-filtering for audio enhancement, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, audio data may be received via an interface for an audio enhancement system, in some embodiments. For example, the audio may be received from an audio sensor, as discussed above with regard to FIGS. 2-3A and provided to a provider network service, like audio-transmission service 210, or may be recorded, uploaded, or otherwise submitted to another system that implements audio enhancement, as discussed above with regard to FIG. 1. In some embodiments, the audio data may be encrypted and/or compressed. Accordingly, the received audio data may be decrypted and decompressed.

As indicated at 620, the audio enhancement system may apply a machine learning model trained to determine respective gain values for different spectrum bands determined for the audio data, in some embodiments. For example, the vast majority of noise signals have a wide bandwidth with a smooth spectrum. Similarly, both the periodic and the stochastic components of speech may have a smooth spectral envelope. Thus, in some embodiments, an envelope from 0 to 20 kHz using 34 bands, spaced according to the human hearing equivalent rectangular bandwidth (ERB) may be implemented. To avoid bands with just one discrete Fourier transform (DFT) bin, a minimum band width of 100 Hz may be used, in some embodiments. For each band of the enhanced signal to be perceptually close to the clean speech, both their total energy and their periodic content may be the same. As discussed above with regard to FIG. 1, the complex-valued spectrum of the signal x(n) for band b in frame 1 may be represented as $x_b(\ell)$. In some embodiments, the L2-norm of that band may be represented as $X_b(\ell)$.

In various embodiments, from the magnitude of the noisy speech signal in band b the ideal ratio mask may be computed, which may be the gain that may need to be applied to $y_b$ such that it has the same energy as $x_b(\ell)$:

$$g_b(\ell) = \frac{X_b(\ell)}{Y_b(\ell)}$$

In some embodiments, in the case where the speech only has a stochastic component, applying the gain $g_b(\ell)$ to the magnitude spectrum in b and b should result in an enhanced signal that is almost indistinguishable from the clean speech signal. On the other hand, when the speech is perfectly periodic, applying the gain $g_b(\ell)$ may result in an enhanced signal that sounds rougher than the clean speech; even though the energy is the same, the enhanced signal is less harmonic than the clean speech. In that case, the noise may be particularly perceptible due to the fact that tones have relatively little masking effect on noise. In that situation, a comb filter to remove the noise between the pitch harmonics and make the signal more periodic may be implemented.

In various embodiments, the speech enhancement pipeline discussed above with regard to FIG. 4 and the example DNN model discussed above with regard to FIG. 5 may be applied to generate the respective gain values $g_b(\ell)$ for ideal ratio masks. In other embodiments, other types of machine learning models, such as an RNN model may be applied.

As indicated at 630, the audio enhancement system may apply an envelope post-filter, as discussed above with regard to FIG. 1, that respectively modifies the respective gain values according to a monotonically increasing function applied to the respective gain values, in some embodiments. As noted above, even when using an ideal (ground truth) ratio mask to enhance audio signal, noise may still be perceptible. In various embodiments, ratio mask post-filtering may be implemented to make the noise less audible without significantly distorting the audio signal.

For example, in various embodiments, a deviation from gains produced for ratio masks may be determined. In this way, the envelope post-filter may be applied to de-emphasize noisier bands slightly further than they would be in the clean signal, while overemphasizing clean bands to compensate. This is done, in various embodiments, by determining a warped gain that is reduced by an amount inversely proportional to the size of the gain value initially determined by the machine learning model for the ideal ratio mask. For example, in some embodiments, the warped gain may be determined according to a monotonically increasing function exemplified as follows:

$$\hat{g}_b^{(w)} = \hat{g}_b \sin\left(\frac{\pi}{2}\hat{g}_b\right)$$

which may leave $\hat{g}_b$ unaffected for clean bands (e.g., with larger gain sizes) as $\hat{g}_b$ may be less attenuated, while squaring the gain $\hat{g}_b$ for noisy bands (e.g., with smaller gain sizes), in some embodiments. In some embodiments, a monotonically increasing function may be applied within a range of 0 to 1.

In some embodiments, to avoid over-attenuating the enhanced signal as a whole, a global gain compensation heuristic may be applied, which may be determined as $$G = \sqrt{\frac{(1+\alpha)\frac{E_0}{E_1}}{1+\alpha\left(\frac{E_0}{E_1}\right)^2}}$$

where $E_0$ is the total energy of the enhanced signal using the original gain $\hat{g}_b$ and $E_1$ is the total energy when using the warped gain $\hat{g}_b^{(w)}$. In some embodiments, $\alpha=0.02$ may be used, which may result in a maximum theoretical gain of 5.5 dB for clean bands. Scaling the final signal for the frame by G may result in a perceptually cleaner signal that is about as loud as the clean signal, in some embodiments. For example, scaling the final signal for the frame by G may be described as:

$$\hat{X}_b = G\hat{g}_b^{(w)} Y_b$$

When listening to enhanced audio through loudspeakers in a room, the impulse response of the room may be added back to the signal such that it blends with any speech coming from the room (e.g., in a two-way audio communication). In scenarios where the enhanced audio data is played back through headphones or other devices placed in, on, or around a listener's ear, the lack of any reverberation can make the enhanced audio signal sound overly dry and unnatural. In such scenarios, a minimum decay can be enforced in the energy, subject to never exceeding the energy of the noisy speech, which may be represented as $\hat{X}^{(r)}(\ell)=\min(\max(\hat{X}_b(\ell),\delta\hat{X}^{(r)}(\ell-1)),\hat{Y}_b(\ell))$ where $\delta$ may be chosen to be equivalent to a reverberation time $T_{60}=100$ ms, in some embodiments. After the frequency-domain enhanced speech is converted back to the time domain, a high-pass filter may be applied to the output. The filter may help eliminate some remaining low-frequency noise and its cutoff frequency may be determined by the estimated pitch of the talker to avoid attenuating the fundamental.

As indicated at 640, an enhanced version of the audio data generated, based, at least in part, on the respectively modified gain values for the different spectrum bands may be provided (e.g., stored, transmitted, or otherwise communicated), in some embodiments (e.g., as discussed above with regard to FIGS. 1-3C). For example, the enhanced version of the audio may be sent by an audio (or audio-video) transmission service to another as part of a two-way audio or video communication between devices that capture, send, and receive audio data. In some embodiments, the enhanced audio data may be stored for subsequent access or replay.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
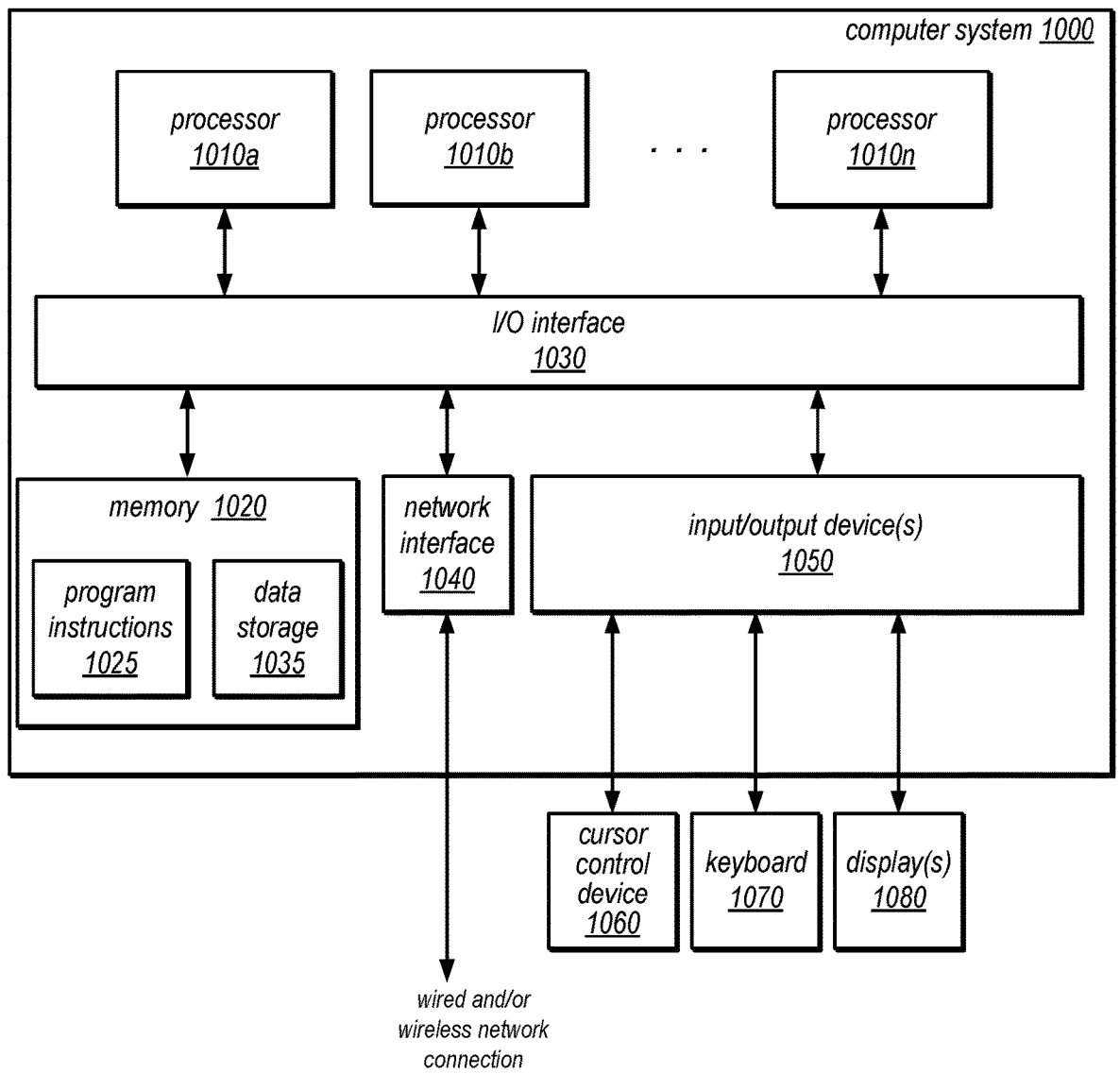
FIG. 7 illustrates an example system to implement the various methods, techniques, and systems described herein, according to some embodiments.

Embodiments of ratio mask post-filtering for audio enhancement as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques as described herein, including the application of self-supervised training for audio anomaly detection and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
  at least one processor; and
  a memory, storing program instructions that when executed by the at least one processor, cause the at least one processor to:
    receive audio data via an interface for an audio enhancement system;
    perform, by the audio enhancement system, a transform on the audio data to determine a plurality of different spectrum bands of the audio data;
    apply, by the audio enhancement system, a deep neural network (DNN) model trained to determine respective ratio masks as gain values for the plurality of different spectrum bands;
    apply, by the audio enhancement system, an envelope post-filter that individually modifies the respective gain values according to a monotonically increasing function applied to the respective gain values;
    perform, by the audio enhancement system, an inverse transform on the plurality of different spectrum bands with the respectively modified gain values to generate an enhanced version of the audio data; and
    send, via the interface of the audio enhancement system, the enhanced version of the audio data to a destination.

2. The system of claim 1, wherein the memory stores further instructions that when executed by the at least one processor, cause the at least one processor to:
  before the performance of the inverse transform, scale the plurality of different spectrum bands with the respectively modified gain values according to a global gain value.

3. The system of claim 1, wherein the system further comprises an audio sensor that captures the audio data and wherein the destination is an audio-transmission service implemented as part of a provider network that transmits the enhanced version of the audio data to an audio playback device over a network connection.

4. The system of claim 1, wherein the audio enhancement system is implemented as part of an audio-transmission service offered by a provider network, wherein the interface for the audio enhancement system supports receiving the audio data via a network connection, and wherein the destination is an audio playback device identified by the audio-transmission service for the audio data.

5. A method, comprising:
  receiving audio data via an interface for an audio enhancement system;
  applying, by the audio enhancement system, a machine learning model trained to determine respective gain values for a plurality of different spectrum bands in the audio data;
  individually modifying, by the audio enhancement system, the respective gain values according to a monotonically increasing function applied to the respective gain values; and
  providing, by the audio enhancement system, an enhanced version of the audio data generated, based, at least in part, on the respectively modified gain values for the plurality of different spectrum bands.

6. The method of claim 5, further comprising:
  before providing the enhanced version of the audio, scaling the plurality of different spectrum bands with the respectively modified gain values according to a global gain value.

7. The method of claim 5, wherein the machine learning model is a deep neural network (DNN) applied to a plurality of features extracted from the audio data.

8. The method of claim 5, further comprising performing a short-time Fourier transform (STFT) to determine the plurality of different spectrum bands in the audio data.

9. The method of claim 5, wherein the monotonically increasing function is applied according to a respective range of 0 to 1.

10. The method of claim 5, wherein the audio data is captured along with corresponding video data that is provided to a same destination as the enhanced version of the audio data.

11. The method of claim 5, wherein providing the enhanced version of the audio data comprises storing the enhanced version of the audio data to a data storage service offered by a provider network.

12. The method of claim 5, wherein the audio enhancement system is implemented as part of a device that includes an audio sensor that captured the audio data, and wherein providing the enhanced version of the audio data comprises sending the enhanced version of the audio data to an audio-transmission service implemented as part of a provider network that transmits the enhanced version of the audio data to an audio playback device over a network connection.

13. The method of claim 5, wherein the audio enhancement system is implemented as part of an audio-transmission service offered by a provider network, wherein the interface for the audio enhancement system supports receiving the audio data via a network connection, and wherein providing the enhanced version of the audio data comprises sending the enhanced version of the audio data to an audio playback device identified by the audio-transmission service for the audio data.

14. One or more non-transitory, computer-readable storage media, storing program instructions that when executed on or across one or more computing devices cause the one or more computing devices to implement an audio enhancement pipeline, wherein the audio enhancement pipeline implements:
  receiving audio data;
  performing a transform on the audio data to determine a plurality of different spectrum bands of the audio data;
  applying a deep neural network (DNN) model trained to determine respective gain values for the plurality of different spectrum bands;
  applying an envelope post-filter that individually modifies the respective gain values according to a monotonically increasing function applied to the respective gain values; and
  performing an inverse transform on the plurality of different spectrum bands with the respectively modified gain values to generate an enhanced version of the audio data.

15. The one or more non-transitory, computer-readable storage media of claim 14, wherein the monotonically increasing function is applied according to a respective range of 0 to 1.

16. The one or more non-transitory, computer-readable storage media of claim 14, wherein the audio data is captured along with corresponding video data that is provided to a same destination as the enhanced version of the audio data.

17. The one or more non-transitory, computer-readable storage media of claim 14, wherein the DNN model is a recurrent neural network.

18. The one or more non-transitory, computer-readable storage media of claim 14, wherein the audio enhancement pipeline is implemented as part of a device that includes an audio sensor that captured the audio data, and wherein the device sends the enhanced version of the audio data to an audio-transmission service implemented as part of a provider network that transmits the enhanced version of the audio data to an audio playback device over a network connection.

19. The one or more non-transitory, computer-readable storage media of claim 14, storing further instructions that when executed on or across the one or more computing devices, cause the audio enhancement pipeline to further implement:
  before performing the inverse transform, scaling the plurality of different spectrum bands with the respectively modified gain values according to a global gain value.

20. The one or more non-transitory, computer-readable storage media of claim 14, wherein the audio enhancement pipeline is implemented as part of an audio-transmission service offered by a provider network, wherein the audio data is received via a network connection at the audio-transmission service, and wherein the audio-transmission service sends the enhanced version of the audio data to an audio playback device identified by the audio-transmission service for the audio data.

* * * * *